(12) United States Patent
Lee (10) Patent No.: US 12,418,467 B2
(45) Date of Patent: Sep. 16, 2025

(54) INFORMATION PROCESSING METHOD (71) Applicant: TOYOTA JIDOSHA KABUSHIKI KAISHA, Toyota (JP)

(72) Inventor: Chunghan Lee, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 18/491,914

(22) Filed: Oct. 23, 2023

(65) Prior Publication Data

US 2024/0275706 A1  Aug. 15, 2024

(30) Foreign Application Priority Data

Feb. 15, 2023  (JP) .................. 2023-021723

(51) Int. Cl.
G06F 13/00 (2006.01)
H04L 43/10 (2022.01)
H04L 69/22 (2022.01)

(52) U.S. Cl.
CPC .............. H04L 43/10 (2013.01); H04L 69/22 (2013.01)

(58) Field of Classification Search
CPC .......... H04L 69/22; H04L 67/02; H04L 43/10

USPC ......................................... 709/245, 224, 201
See application file for complete search history.

(56) References Cited

U.S. PATENT DOCUMENTS 6,629,149 B1 * 9/2003 Fraser ................. H04L 61/4511
709/250

OTHER PUBLICATIONS

Chunghan Lee, Reina Yoshitani, Toshio Hirotsu, Enhancing Packet Tracing of Microservices in Container Overlay Networks using eBPF, [online], Dec. 2022, ACMAINTEC '22: Proceedings of the 17th Asian Internet Engineering Conference, [Retrieved Jan. 24, 2023], https://dl.acm.org/doi/abs/10.1145/3570748.3570756.

* cited by examiner

Primary Examiner — Kenneth R Coulter
(74) Attorney, Agent, or Firm — SoraIP, Inc.

(57) ABSTRACT

A first communication node includes, in a first message generated by a first application addressed to a second communication node, a first communication node for tracking said first message among a plurality of communication nodes, and adding location information indicating the location of the first trace information to a predetermined position before the first message in the first packet containing the first message, transmit the first packet to which the first trace information and the location information have been added.

4 Claims, 9 Drawing Sheets

INFORMATION PROCESSING METHOD

CROSS-REFERENCE TO RELATED APPLICATION

This application claims priority to Japanese Patent Application No. 2023-021723 filed on Feb. 15, 2023, incorporated herein by reference in its entirety.

BACKGROUND

1. Technical Field

The present disclosure relates to communication.

2. Description of Related Art

In recent years, techniques for performing distributed processing using microservices have become widespread. There is distributed tracing as a mechanism for monitoring latency etc. in applications built with microservices architecture. As a related technique, for example, Chunghan Lee, Reina Yoshitani, Toshio Hirotsu, Enhancing Packet Tracing of Microservices in Container Overlay Networks using eBPF, [online], December 2022, ACMAINTEC '22: Proceedings of the 17th Asian Internet Engineering Conference, [Retrieved Jan. 24, 2023], https://dl.acm.org/doi/abs/10.1145/3570748.3570756 discloses a technique for tracing across different network layers.

SUMMARY

An object of the present disclosure is to perform distributed tracing in a physical network.

An aspect of an embodiment of the present disclosure is an information processing method including a first communication node that executes adding, in a first message generated by a first application to a second communication node, first trace information that traces the first message among a plurality of communication nodes, adding location information indicating a location of the first trace information to a predetermined position ahead of the first message in a first packet including the first message, and transmitting the first packet to which the first trace information and the location information have been added.

Further, another aspect provides a program for causing a computer to execute the above information processing method, or a computer-readable storage medium in which the program is non-transitorily stored.

According to the present disclosure, it is possible to perform the distributed tracing in the physical network.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Microservices architecture is known. A microservices architecture is an architecture in which an application provided to a user is divided into multiple independent small-scale applications (hereafter referred to as microservice applications), and the microservice applications are distributed and executed on multiple nodes.

On the other hand, when a microservice application is distributed and executed by multiple nodes, it becomes difficult to track the processing from an overview. To deal with this, a technique called distributed tracing is used.

In distributed tracing, information for tracing (hereinafter referred to as trace information) is attached to data sent and received between microservice applications, and each microservice application writes a trace log for storage etc. based on the trace information. As a result, information such as which microservice application has a parent-child relationship with which microservice application and how long each execution time is can be obtained in a bird's-eye view.

In distributed tracing, generally, trace information is added to the header of HTTP requests sent and received by microservice applications.

By the way, such systems only assume tracing in the same network layer (e.g. application layer). For example, the trace information added to the HTTP header is not assumed to be accessed from network layers other than the application layer because the HTTP message is encapsulated in each layer below the application layer. That is, even if it is possible to evaluate delays caused by processing in the application layer (HTTP), it is difficult to evaluate delays caused by processing in the transport layer (TCP) or network layer (IP).

In order to solve this problem, techniques are known that use trace information from network layers other than the application layer (for example, Chunghan Lee, Reina Yoshitani, Toshio Hirotsu, Enhancing Packet Tracing of Microservices in Container Overlay Networks using eBPF, [online], December 2022, ACM AINTEC '22: Proceedings of the 17th Asian Internet Engineering Conference, [searched Jan. 24, 2023], https://dl.acm.org/doi/abs/10.1145/3570748.3570756). In this technology, a monitoring tool built into the kernel operates at a layer lower than the application layer, and the monitoring tool accesses trace information contained in HTTP headers. This enables, for example, access to trace information from both the application layer and the transport layer, enabling tracing across network layers.

However, this method also has a problem. In order to trace in a layer lower than the network layer, it is necessary for the network switch through which the target packet passes to refer to the aforementioned trace information contained in the passing packet. Network switches are generally implemented by ASICs with fixed functions, but by using ASICs with expandable functions such as programmable ASICs, data other than Ethernet and IP (e.g., HTTP header) can be referenced.

However, even if the function of referring to the HTTP area is added to the ASIC, the trace information cannot be accessed as it is. This is because the HTTP request is stored as variable-length data inside the HTTP header. A network switch can match a fixed-length bit string and trigger parsing, but cannot trigger parsing based on a bit string of unknown length. Thus, if the HTTP request is of variable length, the network switch cannot detect that the forwarding packet contains an HTTP request and therefore cannot start parsing to retrieve the stored trace information. The information processing method according to the present disclosure solves such problems.

An information processing method according to an aspect of the present disclosure includes a first communication node that executes adding, in a first message generated by a first application to a second communication node, first trace information that traces the first message among a plurality of communication nodes, adding location information indicating a location of the first trace information to a predetermined position ahead of the first message in a first packet including the first message, and transmitting the first packet to which the first trace information and the location information have been added.

For example, if the first application generates a message conforming to the Hypertext Transfer Protocol (HTTP) protocol, the first communication node adds the first trace information to the first message conforming to HTTP generated by the application program. The first message can be, for example, a set of HTTP header and HTTP data. The first communication node can add trace information to a predetermined area in the first message (e.g. inside the HTTP header) and pass the packet to a lower layer (e.g. transport layer). In the following description, the term TCP header or IP header is used as a term including a combination of TCP header and payload or IP header and payload.

However, as described above, in this state, the trace information cannot be read by the network switch that forwards the first packet. Therefore, in the information processing method according to the present disclosure, location information for teaching the location of the first trace information to the network switch is added at a predetermined position in the first packet. The predetermined position can typically be between the TCP header and the HTTP header, but other positions are also possible. For example, it may be between the TCP header and the HTTP request line or between the TCP header and the HTTP status line. By giving this positional information to the network switch in advance, the location information can be accessed from the network switch.

It should be noted that the location information preferably has a fixed length. By setting the location information to a fixed length, access from network switches becomes easier.

The location information can be, for example, information indicating the length of the HTTP request line. Knowing the length of the HTTP request line allows the network switch forwarding the first packet to recognize the existence of the HTTP request and parse the HTTP header. That is, it becomes possible to cause the network switch to acquire the trace information.

The first communication node may transfer, when second location information is disposed in the predetermined position of a second packet transmitted from the second communication node, the second packet to the first application after deleting the second location information. The second location information is location information added by another communication node. If the first message conforms to HTTP, the location information is data not defined in HTTP. That is, if the location information remains added, an application program that processes HTTP may malfunction. Therefore, the first communication node may delete the location information and pass the packet to the first application.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

First Embodiment

Hereinafter, embodiments of the present disclosure will be described with reference to the drawings. An information processing system according to the present embodiment is a system in which a plurality of nodes (information processing devices) distribute and execute specific information processing.

The information processing system according to the present embodiment executes tasks in a distributed manner by having a plurality of information processing devices communicate with each other. The plurality of information processing devices may be fixed computers or mobile computers. For example, by installing an information processing device in an automobile, it becomes possible to perform distributed processing of tasks generated while the automobile is traveling by a plurality of vehicles traveling in the surrounding area. Each of the plurality of information processing devices runs a microservice application programmed to perform a given task. Such an architecture is called a microservices architecture.

In the information processing system according to the present embodiment, an information processing device that is a parent node requests another information processing device that is located at a lower level to process a task. Also, an information processing device that has been requested to process a task can request other information processing devices to process (partially or entirely) the task. Task division may be performed by any device. Also, each information processing device may execute different types of tasks. After completing the task execution, each node returns the processing result to the parent node. As a result, the final processing result is transmitted to the information processing device, which is the parent node.

Kubernetes is known as a platform that enables such processing. In Kubernetes, multiple microservices run within pods. A computer running Kubernetes has a virtual network interface running, and a unique IP address is assigned to each pod. Task processing can be requested to each microservice by sending a request by HTTP to the pod.

In order to analyze the performance of such a system, it is necessary to record which microservice application started/finished which task and when. Therefore, a method is used in which information for tracing (trace information) is added when sending and receiving tasks and processing results, and a module that processes the trace information performs logging based on the information. This is called distributed tracing. As described above, in a communication protocol for sending and receiving requests and responses using the HTTP protocol, trace information can be stored in the HTTP header. The trace information includes information for tracing. Such information includes, for example, trace identifiers, span identifiers, parent span identifiers, or node identifiers. Based on this, by writing trace logs to a common storage, it becomes possible to get a bird's eye view of how the target application was divided and when it was processed by which microservice application.

Figure 1:
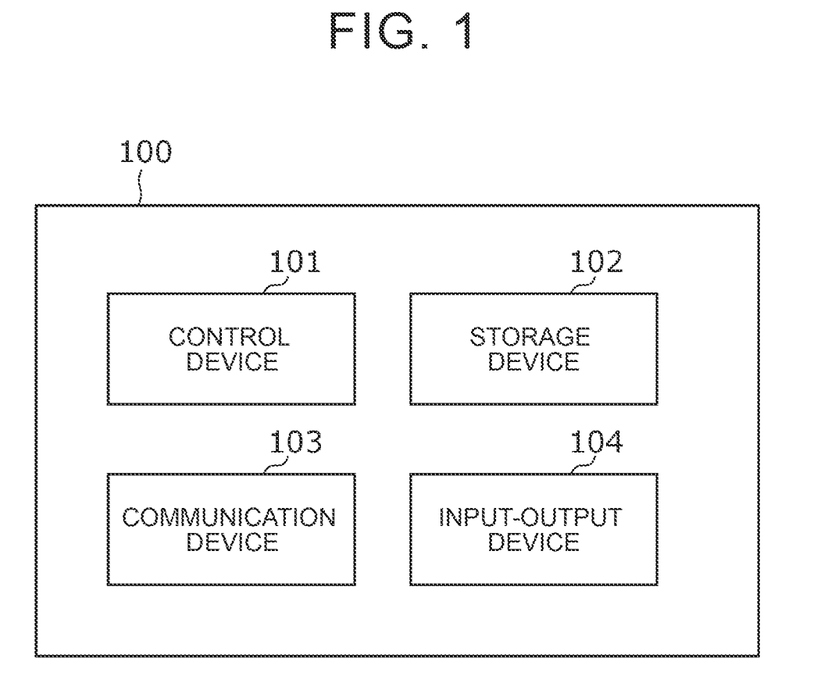
FIG. 1 is a system configuration diagram of an information processing device according to this embodiment.

The configuration of the information processing device according to this embodiment will be described with reference to FIG. 1. The information processing device 100 has a control device 101, a storage device 102, a communication device 103, and an input/output device 104.

The information processing device 100 can be configured by a computer having a CPU (arithmetic processing unit), a main memory device, and an auxiliary memory device. It should be noted that all or part of the illustrated functions may be performed using specially designed circuitry.

The control device 101 is an arithmetic unit that implements various functions of the information processing device 100 by executing a predetermined program. The control device 101 may be realized by a CPU or the like, for example.

The storage device 102 is means for storing information, and is composed of a storage medium such as a RAM, a magnetic disk, or a flash memory. The storage device 102 stores various programs executed by the control device 101, data used by the programs, and the like.

The communication device 103 is a communication interface for connecting the information processing device 100 to a network. If the information processing device 100 is mobile, the communication device 103 can be an interface for wireless communication. The communication device 103 includes, for example, a network interface board and a wireless communication interface for wireless communication.

The input/output device 104 is a device for inputting/outputting information. Specifically, the input/output device 104 includes a display, a touch panel, a keyboard, and the like. A touch panel and a display consist of one touch panel display in this embodiment. The input/output device 104 may include a unit (amplifier or speaker) that outputs audio.

In general, microservices operate at the highest (application layer) of multiple network layers. A packet generated by a microservice passes through the lower network layers and reaches the physical layer. Also, packets received by the target information processing device pass through a plurality of lower network layers and reach the application layer in which microservices operate. Here, a proxy operating in each network layer can log processing in each network layer by referring to the trace information.

Figure 2A:
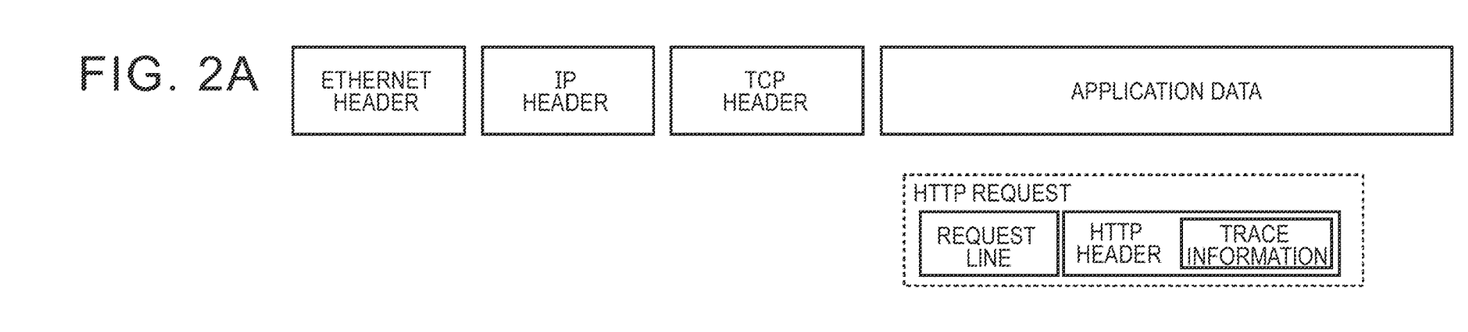
FIG. 2A is a schematic diagram of a frame transmitted from the information processing device 100A.

FIG. 2A is a schematic diagram of a frame transmitted from a related art information processing device. When multiple microservices send and receive data via the HTTP protocol, the application data includes HTTP headers. Further, by inserting information for distributed tracing (hereinafter referred to as trace information) into the HTTP header, tracing in the application layer can be performed.

On the other hand, if tracing is to be performed in a layer lower than the network layer, it is necessary to refer to trace information from the network switch that forwards the packets.

Figure 9A:
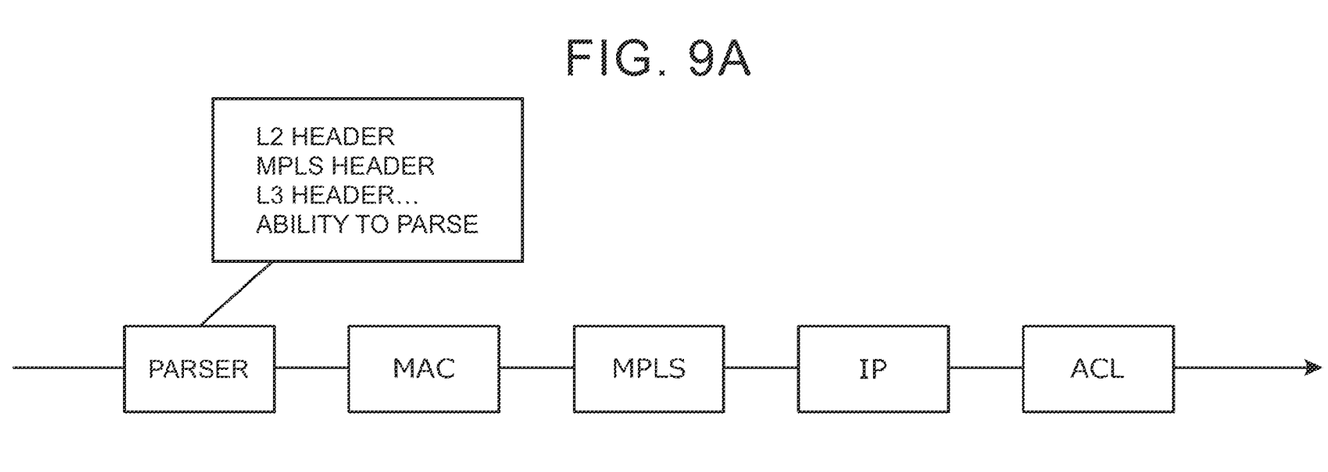
FIG. 9A is a diagram explaining the flow of processing executed by a network switch.

Here, the operation of the network switch will be explained. FIG. 9A is a diagram explaining the operation of a network switch using a general ASIC. The ASIC is an ASIC with fixed functions. Such network switches first perform parsing on packets. This parses the target data, for example, L2 header, MPLS header, L3 header. If the parsing results in matching information, the actions are performed in a predetermined order based on the stored table. Actions are, for example, discarding, forwarding, and rewriting of packets. The illustrated network switch has a fixed function and cannot parse arbitrary data or add new actions. Since it is generally not assumed that the network switch will refer to the HTTP header, it is also impossible to refer to the trace information stored in the HTTP header.

Figure 9B:
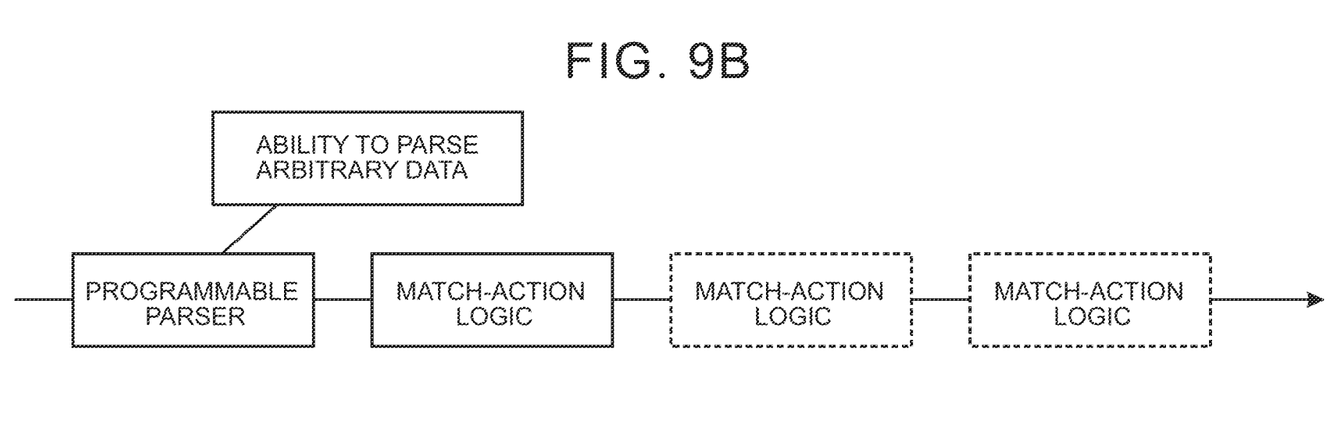
FIG. 9B is a diagram for explaining the flow of processing executed by the network switch.

On the other hand, if a network switch using a programmable ASIC is used, arbitrary data can be parsed and new information processing can be performed based on the parsed data. FIG. 9B is a diagram explaining the operation of a network switch using a programmable ASIC. Such network switches can run programmable parsers to execute arbitrary logic. For example, by writing a parser that parses HTTP headers and implementing logic that performs processing based on the obtained trace information, a method of performing distributed tracing in a physical network can be adopted.

However, although the parser executed by the ASIC can start parsing with the detection of a predetermined bit string as a trigger, it cannot be triggered with a variable-length character string. In this example, we cannot proceed to parse the HTTP headers because the request line is of variable length.

In order to solve this problem, in the information processing device 100 according to the present embodiment, before sending a target packet, information for a network switch to perform tracing (that is, to access trace information from the network switch) is added.

Figure 3:
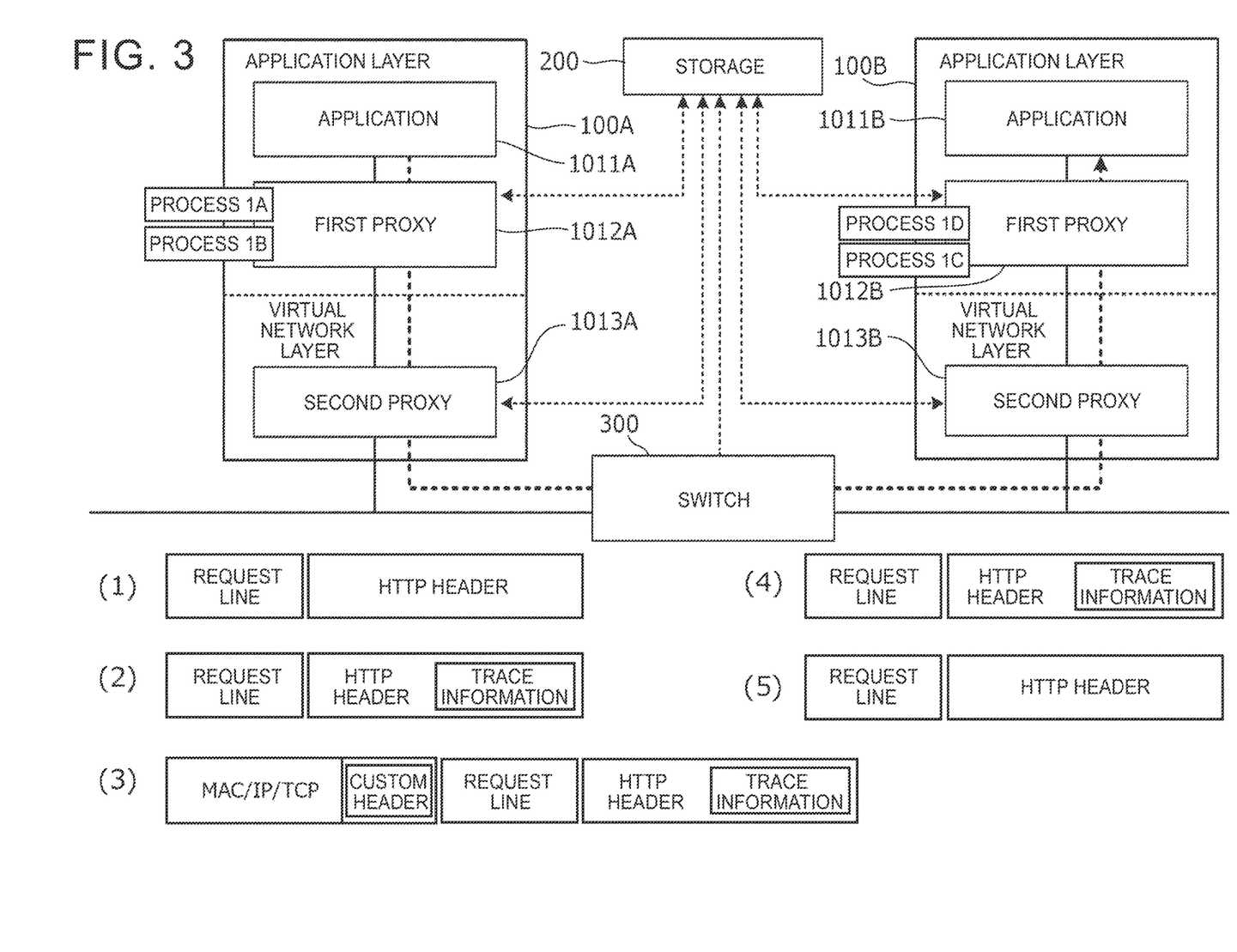
FIG. 3 is a diagram for explaining transmission of a request from the information processing device 100A to the information processing device 100B.
Figure 4:
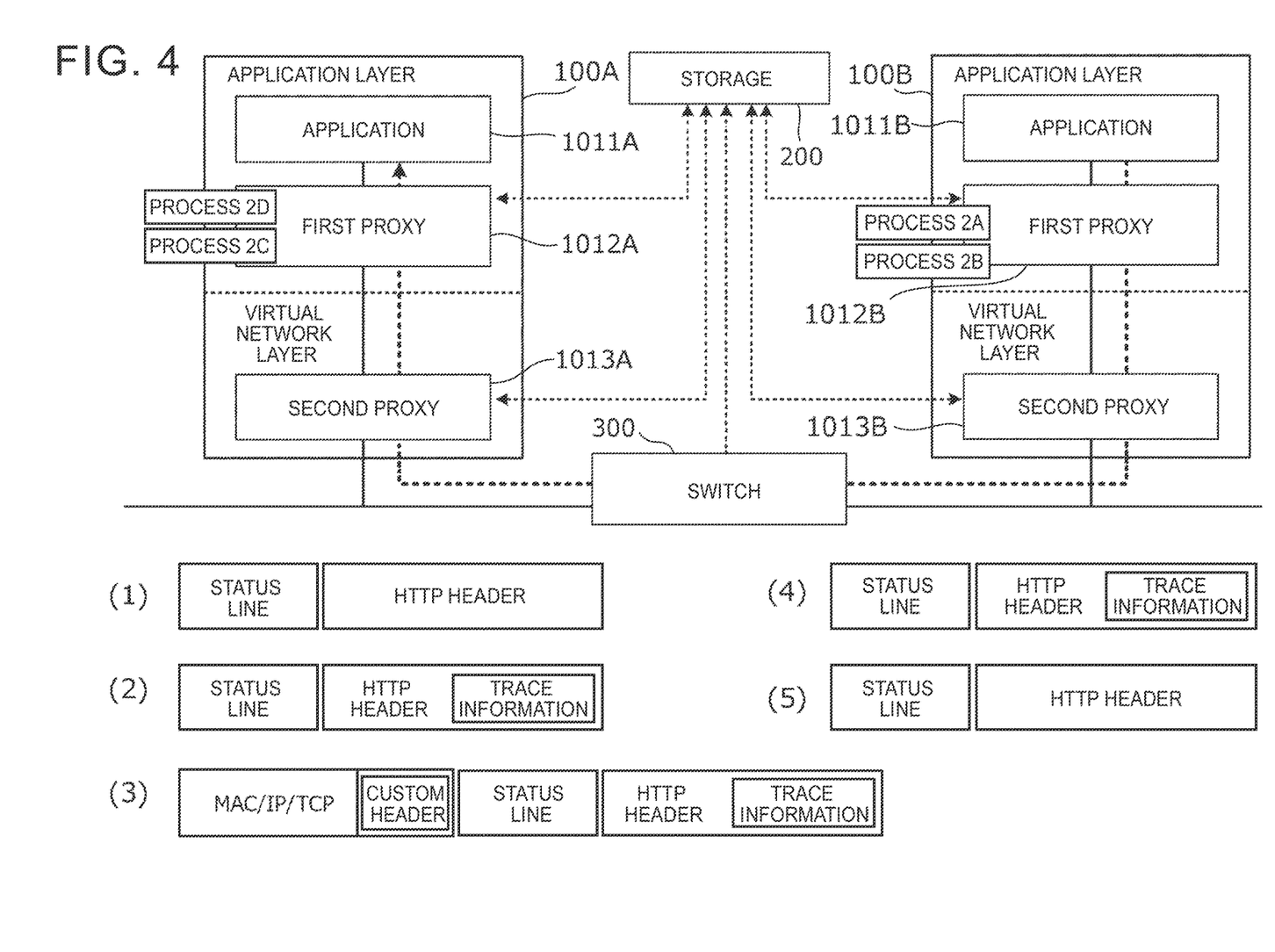
FIG. 4 is a diagram for explaining transmission of a response from the information processing device 100B to the information processing device 100A.

FIGS. 3 and 4 are diagrams for explaining connection relationships among a plurality of modules operating in the information processing device 100. Here, a device that requests task processing is referred to as an information processing device 100A, and a device that receives a request, executes a task, and returns a response is referred to as an information processing device 100B. Both devices (information processing device 100) have the same configuration. The information processing device 100A is an example of a "first communication node". In this case, the information processing device 100B is an example of a "second communication node". Information processing devices 100A and 100B are configured to be able to communicate with storage 200 that manages trace logs. In the following description, logging refers to writing trace logs to the storage 200.

As illustrated, in the information processing device 100A, an application 1011A, a first proxy 1012A, and a second proxy 1013A operate as functional modules. Also, in the information processing device 100B, an application 1011B, a first proxy 1012B, and a second proxy 1013B operate as functional modules. Note that the proxy in this embodiment refers to a module that relays data. A proxy in this embodiment need not have functions such as proxy access, data caching, and filtering. A switch 300, which is a network switch, is arranged on a path connecting the information processing devices. In this example, one switch 300 is illustrated, but a plurality of switches 300 may be used.

In addition, in this embodiment, the virtual network layer is exemplified as a network layer lower than the application layer. However, if the virtual network is not running on the target computer, the virtual network layer can be replaced with a layer lower than the transport layer, a layer lower than the network layer, or a layer lower than the data link layer, etc. Also, the application layer in this embodiment does not necessarily have to match the application layer in the OSI model.

Note that the application 1011A and the application 1011B, the first proxy 1012A and the first proxy 1012B, and the second proxy 1013A and the second proxy 1013B are each the same module. When there is no need to distinguish between the sender and receiver of requests, they are referred to as application 1011, first proxy 1012, and second proxy 1013, respectively. Each module is executed on the control device 101 by software.

Also, the second proxy 1013 may be operated by Extended Berkeley Packet Filter (eBPF). eBPF is a technology that allows arbitrary programs to be executed at the kernel level without changing the source code of the OS kernel or adding modules. This makes it possible to read and write application data in a network layer lower than the application layer.

FIG. 3 is a diagram illustrating transmission of a request from the information processing device 100A to the information processing device 100B, and FIG. 4 is a diagram illustrating transmission of a response from the information processing device 100B to the information processing device 100A.

First, transmission of a request will be described with reference to FIG. 3. Application 1011A is application software on which microservices are executed. The application 1011A performs a process of executing a task requested by a higher-level microservice application, a process of requesting a lower-level microservice application to execute the task, and a process of generating application data according to the application layer protocol. In this example, the application 1011A employs HTTP as an application layer protocol and requests other nodes to execute tasks via HTTP requests.

First proxy 1012 relays packets flowing between the lower network layer and application 1011. Furthermore, the first proxy 1012 performs the following processing.

(Process 1A) When a message including an HTTP request is delivered from the application 1011A, processing of adding trace information to the message and performing logging in the application layer (executed by the first proxy 1012A)

(Process 1B) Following process 1A, a process of adding a custom header just before the request line and forming a packet (performed by the first proxy 1012A)

(Processing 1C) Processing of deleting the custom header included in the packet when the packet including the HTTP request is delivered from the virtual network layer (executed by the first proxy 1012B)

(Processing 1D) Processing for logging in the application layer and deleting trace information (executed by the first proxy 1012B)

First, process 1A will be described. The application 1011A transmits a message including an HTTP request requesting processing to another microservice application, as indicated by (1) in FIG. 3. Here, the first proxy 1012A inserts trace information into the HTTP header. (2) in FIG. 3 is an example of a message in which trace information is inserted. Also, the first proxy 1012A performs logging based on the contents of the trace information. That is, the application layer writes the trace log to the storage 200.

Next, the first proxy 1012A executes a process of adding a custom header just before the request line as process 1B. A custom header is fixed-length data for notifying a network switch of the location of trace information.

A specific description will be given with reference to FIG. 2B. As shown, an HTTP request is composed of an HTTP request line and an HTTP header. An HTTP request line (hereinafter simply "request line") includes a method (get, post, etc.), a URI, and a version, and its length is variable. In order for switch 300 to parse HTTP headers, the length of the request line must be known. Therefore, in this embodiment, fixed-length data for notifying the length of the request line is inserted between the TCP header and the HTTP request when composing the packet. This data is called a custom header.

Figure 2B:
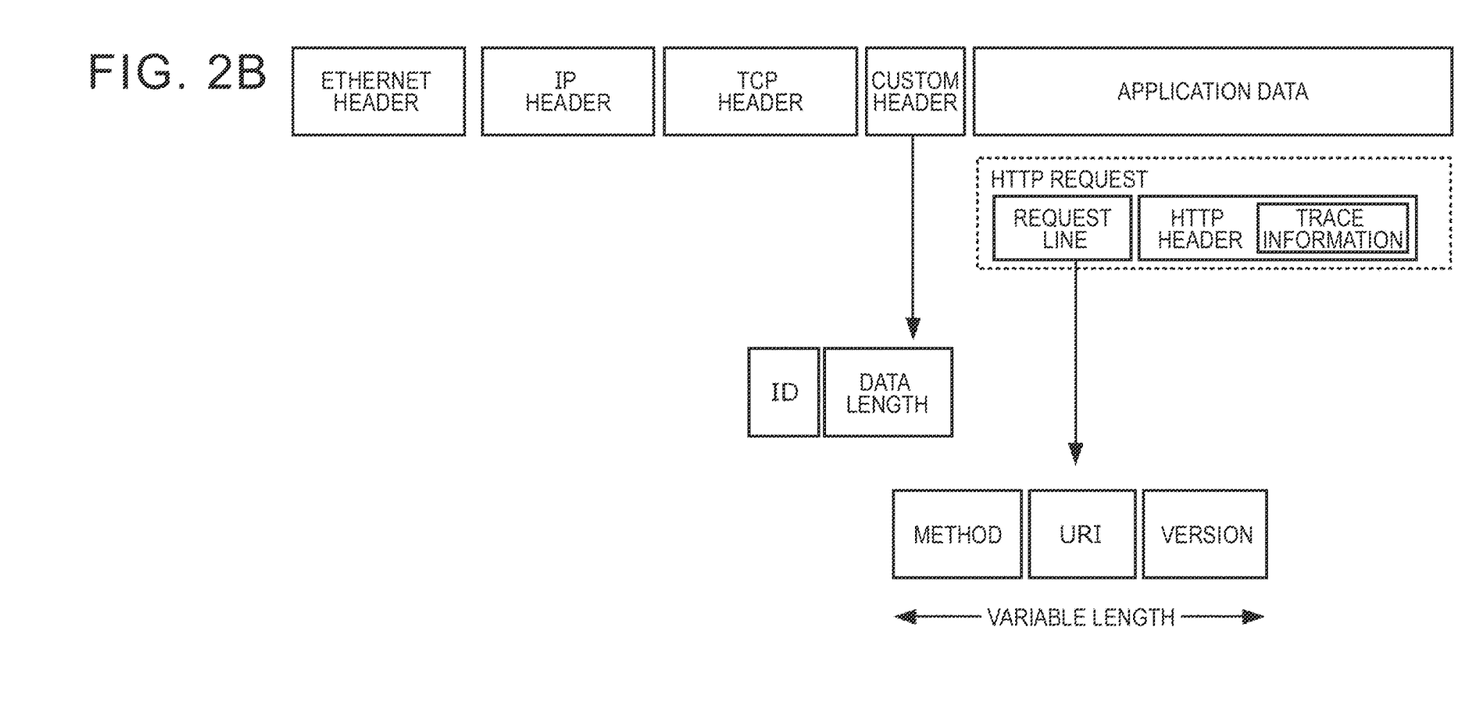
FIG. 2B is a schematic diagram of a frame transmitted from the information processing device 100A.

The custom header includes an identifier (ID) and data length of the custom header, as shown in FIG. 2B. The data length is a numerical value indicating the length of the request line. The data length may be a set of multiple numbers, such as method length, URI length, and version length. Since the custom header is placed immediately after the TCP header, the switch 300 that processes the packet can identify the area where the request line exists by detecting the custom header and reading the contents. Also, the detection of the request line can be used as a trigger to start parsing of the data that follows, allowing access to the trace information. After process 1B, the packet becomes as indicated by (3) in FIG. 3.

Packets with custom headers and trace information inserted are passed to the second proxy 1013A. Second proxy 1013A performs logging based on the inserted trace information. That is, the trace log is written to the storage 200 in the virtual network layer. This makes it possible to record delays and the like caused by the TCP and IP layers of the virtual network layer. It is assumed that the second proxy 1013A recognizes the existence of the custom header and can appropriately access the trace information.

Also, the packet in which the trace information is inserted reaches the information processing device 100B on the reception side via the network, and is processed by the second proxy 1013B. The second proxy 1013B similarly performs logging based on the inserted trace information. That is, the trace log is written to the storage 200 in the virtual network layer. It is assumed that the second proxy 1013B is also aware of the existence of the custom header and has appropriate access to the trace information.

Next, process 1C will be described. A packet received by the first proxy 1012B of the information processing device 100B has a custom header inserted therein, as indicated by (3) in FIG. 3. When the first proxy 1012B detects a custom header from the received packet, in process 1C, the first proxy 1012B deletes the custom header and rearranges (moves forward) the data following the custom header. This is because the application 1011B cannot normally process the packet if the custom header remains. As a result, the received packet becomes as indicated by (4) in FIG. 3.

The first proxy 1012B then performs logging based on the trace information. That is, the application layer writes the trace log to the storage 200. The first proxy 1012B then deletes the trace information as process 1D. As a result, the packet handed over to the application 1011B is the same as the one generated by the source application 1011A, as indicated by (5) in FIG. 3.

Next, transmission of a response will be described with reference to FIG. 4. The application 1011B executes a task according to the request (HTTP request) sent from the application 1011A and generates a response (HTTP response). The application 1011B operates in the application layer like the application 1011A, and transmits and receives data using the HTTP protocol. Note that in the HTTP response, a status line is arranged instead of the request line.

Upon receiving the HTTP response, the first proxy 1012 executes the following processing.

(Process 2A) Processing of adding trace information to the message (HTTP response) delivered from the application 1011B and performing logging in the application layer (executed by the first proxy 1012B)

(Process 2B) Following process 2A, a process of adding a custom header just before the status line and forming a packet (performed by the first proxy 1012B)

(Process 2C) Processing of deleting the custom header included in the packet when the packet including the HTTP response is delivered from the virtual network layer (executed by the first proxy 1012A)

(Process 2D) Processing for logging in the application layer and deleting trace information (executed by the first proxy 1012A)

First, process 2A will be described. The application 1011B transmits a message (HTTP response) corresponding to the task processing result, as indicated by (1) in FIG. 4. Here, the first proxy 1012B inserts trace information into the HTTP header. (2) in FIG. 4 is an example of a message in which trace information is inserted. The position where the trace information is inserted can be the same position as in process 1A. Also, the first proxy 1012B performs logging based on the contents of the trace information.

Next, the first proxy 1012B executes a process of adding a custom header just before the status line as process 2B. After process 2B, the packet becomes as shown in (3) in FIG. 4.

Packets with custom headers and trace information inserted are passed to the second proxy 1013B. Second proxy 1013B performs logging based on the inserted trace information.

Also, the packet in which the trace information is inserted reaches the information processing device 100A on the reception side via the network, and is processed by the second proxy 1013A. The second proxy 1013A similarly performs logging based on the inserted trace information.

Next, process 2C will be described. A packet received by the first proxy 1012A of the information processing device 100A has a custom header inserted therein, as indicated by (3) in FIG. 4. When the first proxy 1012A detects a custom header from the received packet, in process 2C, it deletes the custom header and rearranges (moves forward) the data following the custom header. As a result, the received packet becomes as indicated by (4) in FIG. 4.

First proxy 1012A then performs logging based on the trace information. That is, the application layer writes the trace log to the storage 200. The first proxy 1012A then deletes the trace information as process 2D. As a result, the packet handed over to the application 1011B becomes the same as the one generated by the source application 1011B, as indicated by (5) in FIG. 4.

Next, how the switch 300 processes packets to which custom headers are added will be described. The switch 300 has a function of referring to bits in a predetermined area of a packet to be transferred, determining the existence of a processing target (for example, Ethernet header or IP header), and starting parsing. For example, if the switch 300 detects an IP header from a forwarded packet, it begins parsing the IP header. As a result of parsing, the switch 300 can acquire data for processing (for example, when the object is the IP header, the source IP address, the destination IP address, etc.). Also, the switch 300 executes a predetermined action based on the acquired data and the stored table. Actions are, for example, discarding, forwarding, and rewriting of packets.

The switch 300 in this embodiment has information about the arrangement position and length of the custom header in advance, and has a function of parsing the HTTP header based on the detected custom header. Specifically, the length of the request line (status line) indicated by the custom header is acquired, and based on the length, the existence of the request line (status line) is detected, and the following HTTP header perform parsing. As a result, trace information contained in the HTTP header can be obtained. Also, logging can be performed based on the trace information. That is, information about the timing at which the target packet passed through the switch 300 can be recorded in a layer below the network layer.

Next, a flowchart of processing executed by the first proxy 1012 will be described. As described above, the processing executed by the first proxy 1012 can be classified into the following four types.

Figure 5:
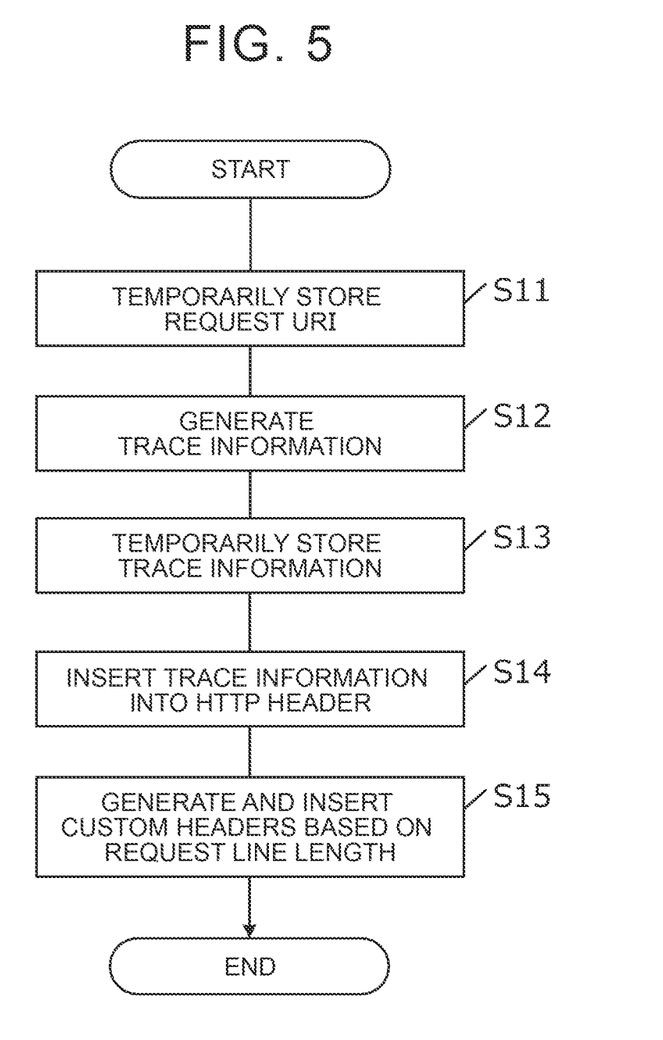
FIG. 5 is a flowchart of process 1A executed by the first proxy.

Processes 1A and 1B: process of adding trace information and a custom header to a message containing an HTTP request to form a packet Processes 1C and 1D: Processes for removing trace information and custom headers from packets containing HTTP requests Processes 2A and 2B: process of adding trace information and a custom header to a message containing an HTTP response to form a packet Processes 2C and 2D: Processes for removing trace information and custom headers from packets containing HTTP responses FIG. 5 is a flowchart of processes 1A and 1B. The illustrated process is initiated by first proxy 1012A when first proxy 1012A receives a message containing an HTTP request from application 1011A. First, in S11, the request URI included in the received message is temporarily stored. This is to identify a set of HTTP requests and corresponding HTTP responses. The stored request URI is used when an HTTP response is received in process 2D.

Next, in S12, trace information is generated. The trace information includes, for example, a trace identifier, a span identifier, a parent span identifier, or a node identifier. The trace information is an example of "first trace information".

Next, in S13, the generated trace information is temporarily stored. Then, in S14, the generated trace information is inserted into the HTTP header.

Next, in S15, a custom header is generated based on the length of the request line, and the custom header is inserted between the TCP header and the request line to compose a packet.

When the above processing is completed, the first proxy 1012A passes the target packet to the lower network layer. Also, the first proxy 1012A performs logging based on the trace information. This makes it possible to record when the HTTP request generated by the application 1011A was sent.

Figure 6:
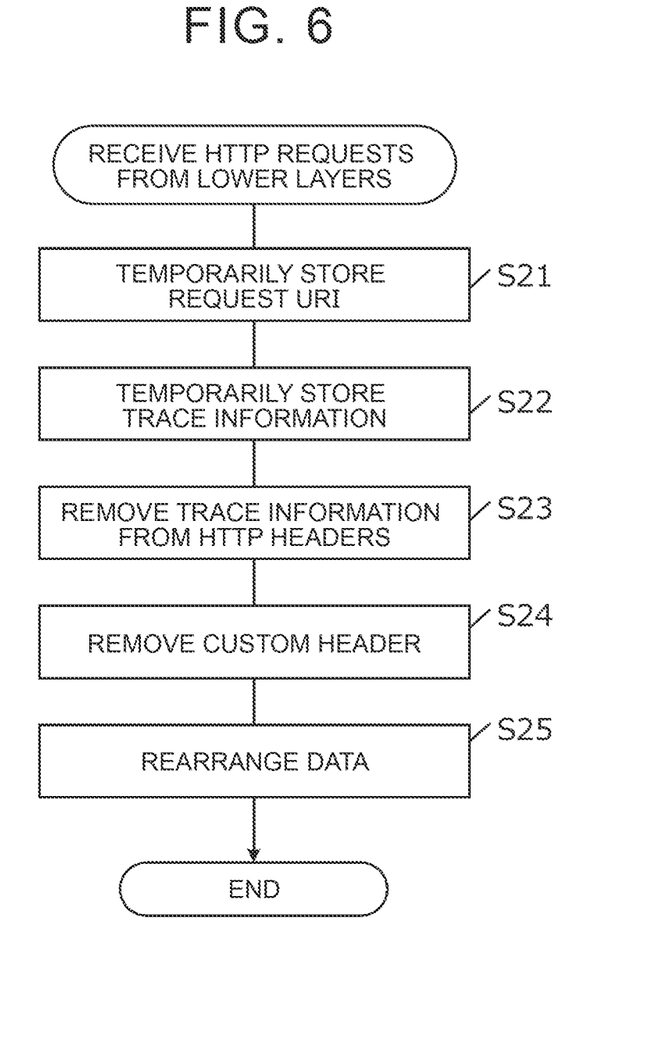
FIG. 6 is a flowchart of process 1B executed by the first proxy.

FIG. 6 is a flowchart of processes 1C and 1D. The illustrated process is initiated by first proxy 1012B when first proxy 1012B receives a packet containing an HTTP request from a lower network layer (second proxy 1013B). First, in S21, the request URI included in the received packet is temporarily stored. This is to identify a set of HTTP requests and corresponding HTTP responses. The stored request URI is used when an HTTP response is received in process 2A.

Next, in S22, trace information included in the HTTP header is obtained and temporarily stored. This is for generating trace information when an HTTP response is returned from the application 1011B. Also, the first proxy 1012B performs logging based on the trace information.

This makes it possible to record the timing at which the HTTP request processing by the application 1011B was started.

Next, in S23, the trace information is deleted from the HTTP header. Next, at S24, the custom header inserted between the TCP header and the request line is deleted. Then, in S25, data other than the trace information and the custom header are rearranged. As a result, the target packet returns to the state before the process 1A was executed. When the above processing is completed, the first proxy 1012B hands over the target packet to the application 1011B.

Figure 7:
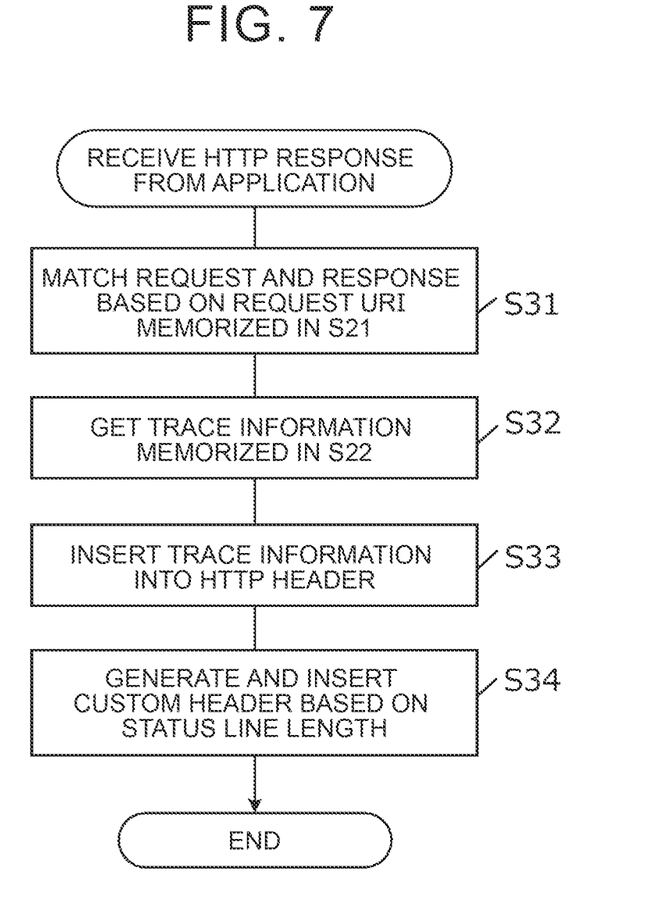
FIG. 7 is a flowchart of process 2B executed by the first proxy.

FIG. 7 is a flowchart of processes 2A and 2B. The illustrated process is initiated by first proxy 1012B when first proxy 1012B receives a message containing an HTTP response from application 1011B. First, in S31, the HTTP request and the HTTP response are matched based on the request URI temporarily stored in S21 and the request URI included in the HTTP response. This identifies a set of HTTP request and HTTP response. Next, in S32, the trace information temporarily stored in S22 is acquired, and based on this, in S33, trace information is generated and the generated trace information is inserted into the HTTP header. The trace information generated in this step may be a complete copy of the trace information stored in S22, or may include a part of the trace information stored in S22. The trace information generated in this step may be any information as long as the correspondence with the trace information stored in S22 is known.

Next, in S34, a custom header is generated based on the length of the status line, and the custom header is inserted between the TCP header and the HTTP header to configure the packet.

When the above processing is completed, the first proxy 1012B passes the target packet to the lower network layer. Also, the first proxy 1012B performs logging based on the trace information. This makes it possible to record at what timing the HTTP response generated by the application 1011B was transmitted.

Figure 8:
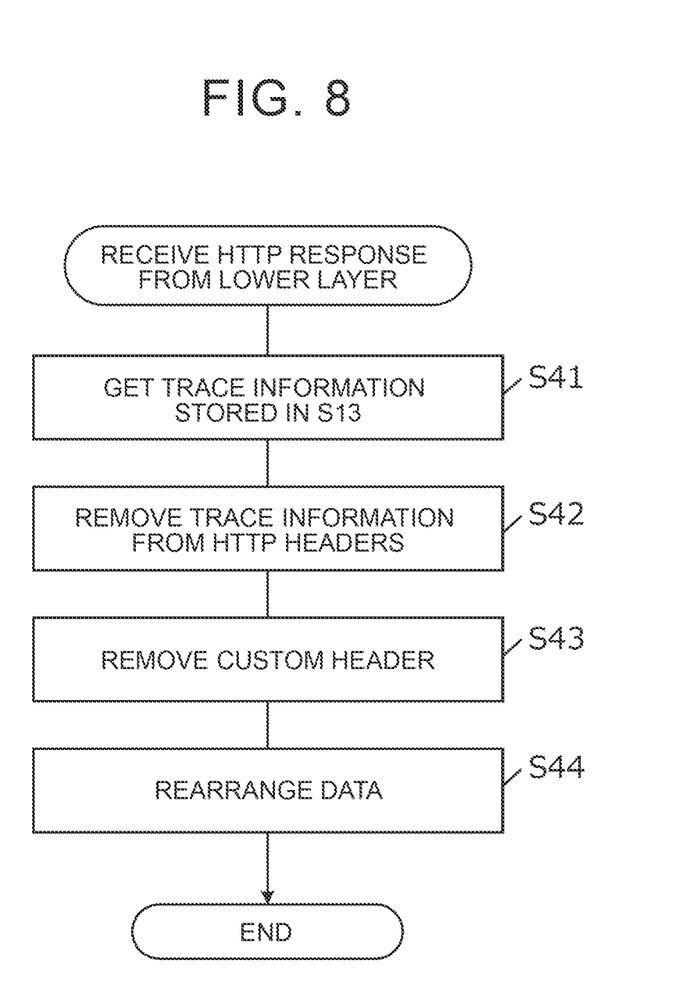
FIG. 8 is a flowchart of process 2A executed by the first proxy.

FIG. 8 is a flowchart of processes 2C and 2D. The illustrated process is initiated by first proxy 1012A when first proxy 1012A receives a packet containing an HTTP response from a lower network layer (second proxy 1013A). First, in S41, the trace information temporarily stored in S13 is obtained and compared with the trace information contained in the received HTTP header. Here, if the trace information matches, the trace information is deleted from the header of the received HTTP response in S42. Also, the first proxy 1012A performs logging based on the trace information. This makes it possible to record at what timing the application 1011A started processing the HTTP response.

Next, in S43, the custom header inserted between the TCP header and status line is deleted. Then, in S44, data other than the trace information and the custom header are rearranged. As a result, the target packet returns to the state before the process 2A was executed. When the above processing is completed, the first proxy 1012A hands over the target packet to the application 1011A.

As described above, in the information processing device according to the present embodiment, the first proxy 1012 operating on the application layer performs the above-described processing, i.e. adding and removing custom headers between the application 1011 and the second proxy 1013 operating on the virtual network layer. This allows tracing to network switches without impacting other services (microservices provided by application 1011) running at the application layer.

Second Embodiment

In the first embodiment, the trace information was placed inside the HTTP header. However, if the trace information is placed from the middle to the end of the HTTP header, it may take a long time to read. This is because the HTTP header has a variable length and must be searched from the beginning. That is, when the amount of data to be processed increases, there is a risk that the delay will increase. Also, if there is an upper limit to the size of data that the ASIC can parse, the switch 300 may not be able to access the trace information.

To solve this problem, when the first proxy 1012A inserts the trace information into the HTTP header, it may place the trace information ahead of the HTTP header (or before the request line). Also, when the first proxy 1012B inserts the trace information into the HTTP header, the trace information may be placed before the HTTP header (or before the status line). This allows fast access to trace information in the network layer below the application layer.

Note that if trace information is arranged at the above-described position, a packet that does not conform to HTTP may be formed, and such a packet may not be processed by the application 1011. However, placement and deletion of trace information are performed by the first proxy 1012 and therefore do not affect the processing performed by the application 1011.

Modified Examples

The above-described embodiments are merely examples, and the present disclosure may be appropriately modified and implemented without departing from the scope thereof. For example, the processes and means described in the present disclosure can be freely combined and implemented as long as no technical contradiction occurs.

For example, in the description of the embodiments, an example in which an application program transmits a message conforming to HTTP was given, but if it is a protocol for transmitting and receiving variable-length messages, a protocol other than HTTP such as gRPC or MQTT can also be adopted.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc (CD)-read-only memory (ROM), digital versatile disc (DVD), Blu-ray disc, etc.), a ROM, a random access memory (RAM), an erasable programmable read only memory (EPROM), an electrically erasable programmable read only memory (EE- PROM), a magnetic card, a flash memory, an optical card, and any type of medium suitable for storing electronic commands.

What is claimed is:

1. An information processing method comprising a first communication node that executes
    adding, in a first message generated by a first application to a second communication node, first trace information that traces the first message among a plurality of communication nodes,
    adding location information indicating a location of the first trace information to a predetermined position ahead of the first message in a first packet including the first message,
    transmitting the first packet to which the first trace information and the location information have been added, and
    transferring, when second location information is disposed in the predetermined position of a second packet transmitted from the second communication node, the second packet to the first application after deleting the second location information.

2. The information processing method according to claim 1, wherein:
    the first message is a message conforming to Hypertext Transfer Protocol (HTTP); and
    the first trace information is added within an HTTP header.

3. The information processing method according to claim 2, wherein the location information is fixed-length data added between a TCP header and the HTTP header.

4. The information processing method according to claim 3, wherein a network switch that relays the first packet between the first communication node and the second communication node executes
    detecting the location information from the first packet,
    obtaining the first trace information by parsing the HTTP header based on the location information, and
    storing a log related to tracing of the first message in a predetermined storage based on the first trace information.

* * * * *